United States Patent
Flamini et al.

(10) Patent No.: US 9,628,612 B2
(45) Date of Patent: Apr. 18, 2017

(54) MOBILE PHONE CALL HANDLING

(71) Applicant: INTERNATIONAL BUSINESS MACHINES CORPORATION, Armonk, NY (US)

(72) Inventors: Elisabetta Flamini, Romsey (GB); Rajasinghe S. Gunaratne, Hampshire (GB); Ravi D. Khetani, London (GB); Kyle Milner, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/974,525

(22) Filed: Dec. 18, 2015

(65) Prior Publication Data
US 2016/0182710 A1 Jun. 23, 2016

(30) Foreign Application Priority Data

Dec. 19, 2014 (GB) .................................. 1422743.3

(51) Int. Cl.
| | | |
|---|---|---|
| *H04M 3/02* | (2006.01) | |
| *H04W 4/14* | (2009.01) | |
| *H04M 3/436* | (2006.01) | |
| *H04W 4/02* | (2009.01) | |

(52) U.S. Cl.
CPC ............ *H04M 3/02* (2013.01); *H04M 3/436* (2013.01); *H04W 4/14* (2013.01); *H04M 2201/18* (2013.01); *H04W 4/023* (2013.01)

(58) Field of Classification Search
CPC ......... H04M 1/72519; H04M 1/72569; H04M 3/02; H04M 3/42348; H04M 3/428; H04W 4/02

USPC ....... 455/567–569.2, 417–420, 456.1–456.6, 455/575.9
See application file for complete search history.

(56) References Cited

U.S. PATENT DOCUMENTS

| | | | |
|---|---|---|---|
| 2006/0153358 A1 | 7/2006 | Zernovizky et al. | |
| 2007/0127704 A1* | 6/2007 | Marti ................. | H04M 1/2473 379/373.01 |
| 2013/0016819 A1* | 1/2013 | Cheethirala ............ | H04M 1/65 379/142.05 |
| 2014/0295807 A1* | 10/2014 | Li .......................... | H04W 4/16 455/414.1 |

FOREIGN PATENT DOCUMENTS

| | | |
|---|---|---|
| EP | 2779607 A1 | 9/2014 |
| WO | WO 2005/125156 | 12/2005 |
| WO | WO 2013/049048 A2 | 4/2013 |

OTHER PUBLICATIONS

International Search Report, Application No. GB1422743.3, filed Dec. 19, 2014, dated Apr. 2015, 3 pages.

* cited by examiner

*Primary Examiner* — Michael Mapa
(74) *Attorney, Agent, or Firm* — Heslin Rothenberg Farley & Mesiti P.C.

(57) ABSTRACT

A method, system, and computer program product include a processor detecting, ambient noise in the vicinity of the mobile telephone and accessing one or more stored sounds. The processor determines that the ambient noise matches a stored sound of the one or more stored sounds and based on the determining, switches handling of incoming calls to the mobile phone to a predetermined state.

13 Claims, 6 Drawing Sheets

MOBILE PHONE CALL HANDLING

PRIOR FOREIGN APPLICATION

This application claims priority from United Kingdom (GB) patent application number 1422743.3, filed Dec. 19, 2014, which is hereby incorporated herein by reference in its entirety.

BACKGROUND

Using a mobile telephone means that the user is always available to be contacted, but people often go through periods in their day when they do not wish to be disturbed. An example of this is when the user is already in an active conversation face-to-face with another person. As well as being a problem for general phone users, there are specific social situations where the user may wish to be contacted, but only if the user is not currently conversing. For example, an estate agent showing customers around houses will often receive calls, but in general, the estate agent will want to prioritize the face-to-face conversation over any incoming call because the estate agent is trying to make a sale. One way to avoid being interrupted is by manually changing the settings on a user's mobile phone, by, for example, putting the phone in a silent mode.

SUMMARY

Shortcomings of the prior art are overcome and additional advantages are provided through the provision of a computer program product for operating a mobile telephone. The computer program product comprises a storage medium readable by a processing circuit and storing instructions for execution by the processing circuit for performing a method. The method includes, for instance: detecting, by a processor, ambient noise in the vicinity of the mobile telephone; accessing, by the processor, one or more stored sounds; determining, by the processor, that the ambient noise matches a stored sound of the one or more stored sounds; and switching, by the processor, based on the determining, handling of incoming calls to the mobile phone to a predetermined state.

Shortcomings of the prior art are overcome and additional advantages are provided through the provision of a method of operating a mobile telephone. The method includes, for instance: detecting, by a processor, ambient noise in the vicinity of the mobile telephone; accessing, by the processor, one or more stored sounds; determining, by the processor, that the ambient noise matches a stored sound of the one or more stored sounds; and switching, by the processor, based on the determining, handling of incoming calls to the mobile phone to a predetermined state.

Shortcomings of the prior art are overcome and additional advantages are provided through the provision of a system for operating a mobile telephone. The system includes a memory, one or more processor in communication with the memory, and program instructions executable by the one or more processor via the memory to perform a method. The method includes, for instance: detecting, by a processor, ambient noise in the vicinity of the mobile telephone; accessing, by the processor, one or more stored sounds; determining, by the processor, that the ambient noise matches a stored sound of the one or more stored sounds; and switching, by the processor, based on the determining, handling of incoming calls to the mobile phone to a predetermined state.

Methods and systems relating to one or more aspects are also described and claimed herein. Further, services relating to one or more aspects are also described and may be claimed herein. For example, in an embodiment of the present invention, determining includes determining, by the processor, for a predetermined period of time, that the ambient noise matches the stored sound. In another example, in an embodiment of the present invention, the predetermined state comprises at least one of: passing the incoming calls to voicemail, switching the mobile phone to silent, or rejecting the incoming calls.

Additional features and advantages are realized through the techniques described herein. An embodiment of the present invention may also include switching, by the processor, the handling of the incoming calls back to a previous state after a predetermined period of time. A further embodiment of the present invention may also include receiving, by the processor, an audio input and storing the audio input as the stored sound.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
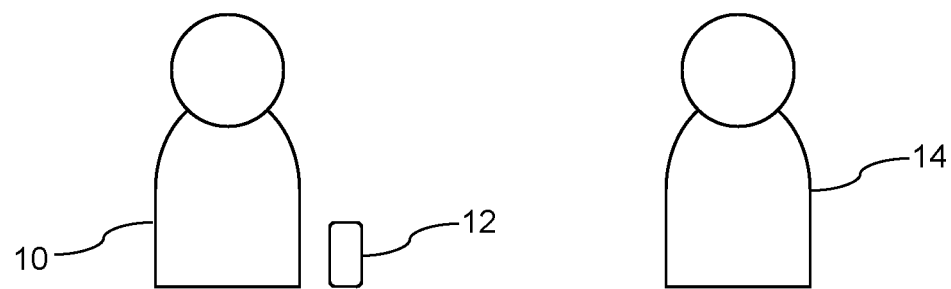
FIG. 1 is a schematic diagram of a user with a mobile telephone.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures. It should be understood that the Figures are merely schematic and are not drawn to scale.

Some embodiments of the present invention relate to a method of operating a mobile telephone, and to the mobile phone itself.

FIG. 1 shows schematically a user 10 with a mobile phone 12, and the user is in a conversation with a colleague 14. In this situation, the user 10 ideally does not wish to be disturbed by the mobile phone 12 ringing in response to an incoming call. Although the user 10 could switch the phone 12 to silent (i.e., a silent mode and/or setting) at the start of the conversation, it is easy to forget to make this change and many such conversations start on an ad-hoc basis, without the user 10 being pre-warned that such a conversation is to begin. For this reason, the user 10 will commonly have his or her phone 12 in its normal response state when conversing with a colleague 14.

However, in an embodiment of the present invention, the user's mobile phone 12 may be configured to switch automatically to a different state, in situations where a determination can be made that the user 10 is in conversation with a colleague 14. To this end, the phone 12 can be provided with a microphone that is constantly (or periodically) listening to the ambient noise in the vicinity of the phone 12. The microphone is able to pick up noises such as a local conversation involving the user 10 of the phone 12. In an embodiment of the present invention, the processor of the phone 12 is able to compare the detected ambient noise to one or more stored sounds (such as the user's voice) and thereby identify that the user 10 is currently busy.

In an embodiment of the present invention, if the processor of the mobile phone 12 does detect that the user 10 is currently in conversation, through the detection and identification of the ambient noise, then the mobile phone 12 will switch into a predetermined state (a do-not-disturb state) which will change how the phone 12 handles incoming calls. The specifics of the new state can be configured by the user 12, but it may include rejecting any incoming calls to the phone 12, so the user 10 will not be disturbed by the phone 12 ringing in response to the incoming call. The incoming call could be diverted straight to voicemail, for example.

Figure 2:
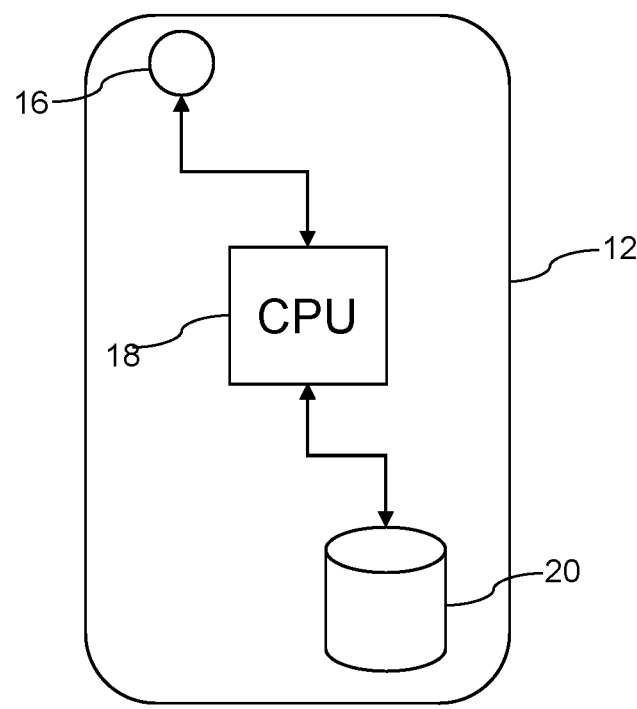
FIG. 2 is a schematic diagram of the mobile phone that may be utilized to in accordance with certain aspects of an embodiment of the present invention may be implemented.

FIG. 2 shows more detail of the internal components of the mobile phone 12. In accordance with certain aspects of an embodiment of the present invention, the mobile telephone 12 comprises a microphone 16, which is arranged to detect ambient noise in the vicinity of the mobile telephone 12, and a processor 18, which is arranged to access one or more stored sounds in a database 20, determine that the detected ambient noise matches one of the stored sounds, and switch the handling of incoming calls to a predetermined state in response to the determination of a match between the detected ambient noise and the one of the stored sounds. The processor 18 is connected to the microphone 16 and the database 20.

In an embodiment of the present invention, the phone 12 can be configured to receive an audio input and store the received audio input as a stored sound in the database 20. The mobile phone 12 can therefore be operated so that the user can record the sounds that the user wants the mobile phone 12 to use as the trigger for the do-not-disturb mode. In one aspect of an embodiment of the present invention, the user's voice and this can be recorded by the mobile phone 12 so that the user's voice can be the primary sound that the mobile phone 12 uses to switch to the do-not-disturb mode. Embodiments of the present invention can utilize other sounds, including but not limited to, the user's vacuum cleaner at home.

In an embodiment of the present invention, the matching of the ambient noise captured by the microphone 16 to a stored sound in the database 20 carried out by the processor 18 may not be an exact match, since it is unlikely that the captured audio will be an exact match to the stored audio. The processor 18 operates in this regard by matching components within the captured audio to components within the stored audio with an above average level of certainty, in order to determine that a match has taken place and that the phone 12 needs to switch to the do-not-disturb mode. In some embodiments of the present invention, the processor 18 may utilize an audio matching and recognizing technique.

Figure 3:
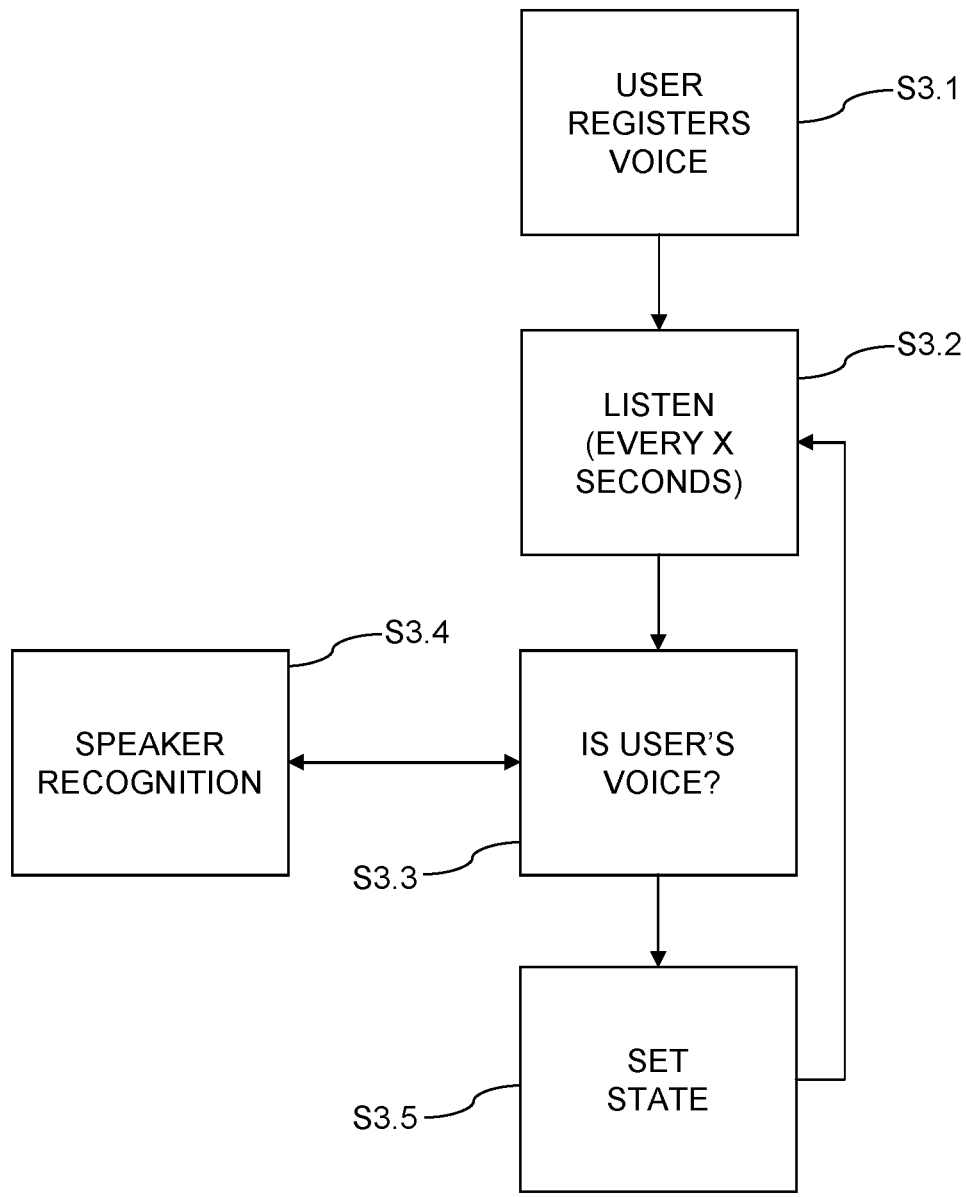
FIG. 3 is a flowchart of a method of operating the mobile telephone in accordance with certain aspects of an embodiment of the present invention.

FIG. 3 summarizes the methodology of operating the mobile phone 12 detect a user's speech, in accordance with certain aspects of some embodiments of the present invention. The user 10 registers his or her voice with the mobile phone 12 by providing a voice sample that is stored in the database 20 (S3.1). The phone 12 listens every x seconds (for example, every five seconds) to detect the ambient noise in the vicinity of the mobile telephone 12 (S3.2). The phone 12 determines if the ambient noise matches the user's stored voice (S3.3). In a speaker recognition module, the processor 18 accessing the stored sounds and determines if the detected ambient noise matches the stored sound (S3.4).

If there is matching detected (S3.3), then the phone 12 switches the handling of the incoming calls to a predetermined state, in response to the determination of the match between the detected ambient noise and the stored sound (S3.5). As mentioned above, the new state can be any of a number of different things, depending upon how the user 10 has configured the phone 12. For example, the default setting could be to refuse all incoming calls and send a text message to the source of the call informing the caller that the user 10 is currently busy. Other settings could include diverting the caller to the user's voicemail.

The method of FIG. 3 also includes a loop back to S3.2 from S3.5, demonstrating that in some embodiments of the present invention, the method depicted can be continually operated so that the listening to the ambient noise can be sustained and if it is detected that the user 10 is no longer in conversation, then the phone 12 can be returned to its previous state of accepting incoming calls. Alternatively, in an embodiment of the present invention, the phone 12 could be switched back to its previous state after a predetermined time period has expired and the phone 12 will revert to attempting to detect the ambient noise in the vicinity of the phone 12 to see if the user 10 is back in conversation.

Aspects of certain embodiments of the present invention were described above in relation to detection of the user's voice, which takes into account a phone user 10 who is busy in a conversation, but the described aspects can be extended to a mobile phone 12 which is able to infer other situations where the phone user 10 is busy and cannot answer the phone, by detecting ambient noise. In an embodiment of the present invention, the phone user 10 can pick up a pre-defined busy state associated to a pre-recorded sound. For example, the state of vacuuming can be associated to a pre-recorded noise of a vacuum cleaner, or other custom sounds can be recorded and associated to new busy states. The sounds could include, for example, the roar of their car, or the noise a user makes when cooking, or the peculiar noise of a bathroom door.

Figure 4:
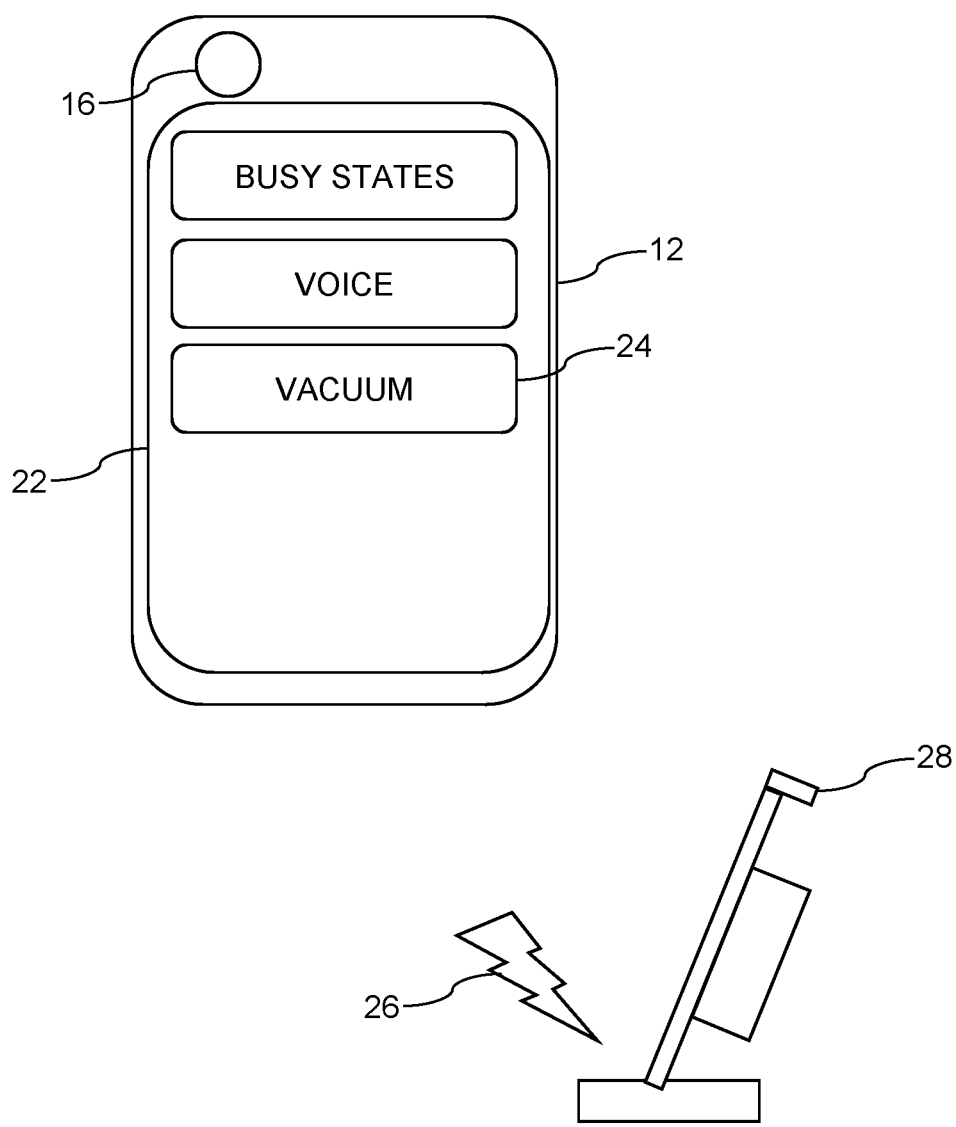
FIG. 4 is a schematic diagram of the user interface of the mobile telephone depicting certain aspects of an embodiment of the present invention.

FIG. 4 shows an example of a graphical user interface (GUI) 22 that the user 10 may utilize to interacting with the mobile phone 12, in accordance with certain aspects of embodiments of the present invention. In the GUI 22 is a button 24, which is labelled "vacuum cleaner." In an embodiment of the present invention, the user presses the button 24 to initiate a sequence whereby the noise 26 from the user's vacuum cleaner 28 is captured by the microphone 16 and stored internally within the phone 12 as one of the sounds stored by the database 20. This sound will now be monitored by the phone 12 and if this sound is detected then the phone 12 will be automatically switched into the do-notdisturb state. The user 10 can repeat this process at any time to add additional sounds to their phone 12 as triggers for switching to the do-not-disturb state.

In an embodiment of the present invention, the user 10 can configure the phone 12 to include a number of possible busy states. When the phone detects a busy state through the recognition of the associated sound, it automatically starts handling incoming calls in a predefined manner. The processor 18 can be either configured to handle incoming calls automatically for the whole duration of the noise, or until an event occurs, for example, another noise, or the repetition of the same noise (bathroom door closing). The mobile phone 12 may therefore be able to automatically switch between different states to reflect the current activity that the user 10 is undertaking without the need for the user 10 to continually change the phone state manually.

In an embodiment of the present invention, when the mobile phone 12 is monitoring the ambient noise for the user's voice, then the phone 12 can be configured from a simple binary, in conversation, not in conversation state to a weighted system using additional inputs. The voice monitoring can be integrated with sentiment analysis of the current conversation to determine if it is positive or negative, since this can influence whether the user 10 wishes to be disturbed. The mobile phone 12 may also be configured to weight different conversations based on to whom the user is talking. The weighting functionality relies on the mobile phone 12 being able to identify different components within the ambient audio and match those components to different stored voices.

In an embodiment of the present invention, the mobile phone 12 can profile new voices and store those patterns. For example, in certain embodiments, the processor 18 may then add more weight to frequently heard voices, people the user 10 talks to more often, over those that are not recognized, people that the user 10 does not know. For example, in this configuration the mobile phone 12 may reject a call if the user 10 is talking to a colleague 14, but would accept a call if the user 10 is ordering a coffee from a shop. In accordance with an aspect of an embodiment of the present invention, the processor 18 effectively performs a two-step test in determining whether to switch to the do-not-disturb state and reject incoming calls. Before switching state, the processor 18 recognizes both voices.

Figure 5:
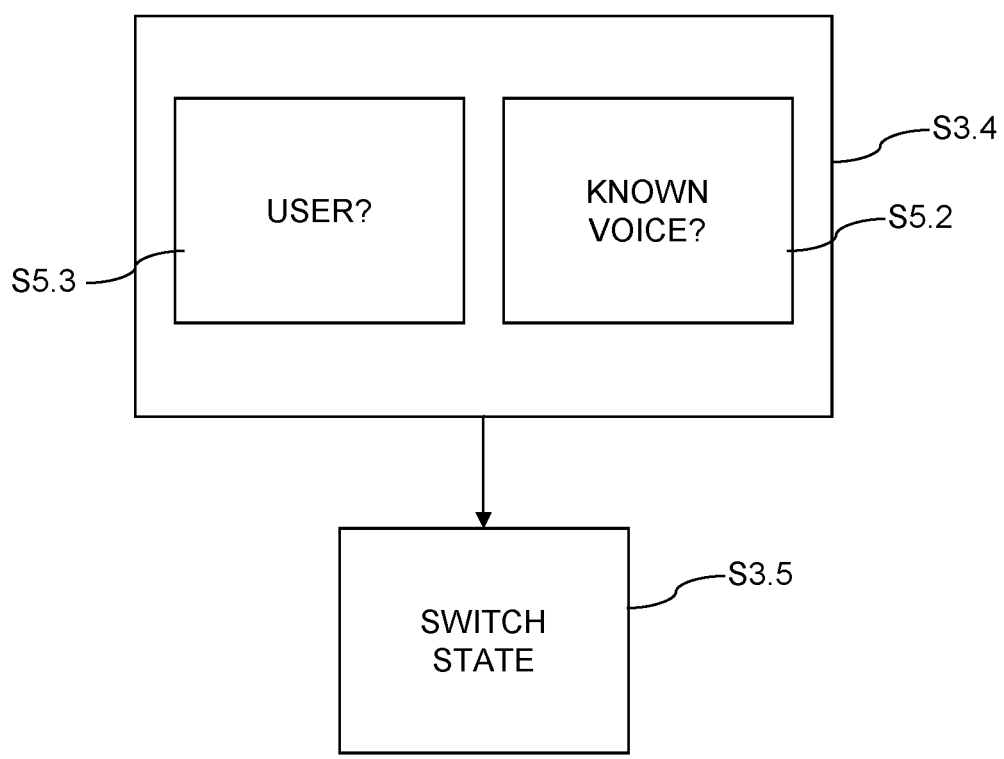
FIG. 5 is a further flowchart of a method of operating the mobile telephone in accordance with certain aspects of an embodiment of the present invention.

FIG. 5 illustrates the two-step test described above, which is integrated into some embodiments of the present invention. In this process, S3.4 of FIG. 3 is effectively broken into two separate aspects, S5.1 and S5.2, before moving to change the state at S3.5. Referring to FIG. 5, in an embodiment of the present invention, a check is made to see if the current ambient audio contains the user's voice (S5.1) and if it does, then a further check is made to see if a further voice in the ambient audio is recognized (e.g., indicating that the user 10 is talking to a known colleague 14) (S5.2). If the current ambient audio contains the user's voice and the ambient audio is recognized, then the switch to the do-not-disturb state takes place (S3.5). The switch ensures that the user 10 is not interrupted in important work situations, but does receive incoming calls in other situations.

Figure 6:
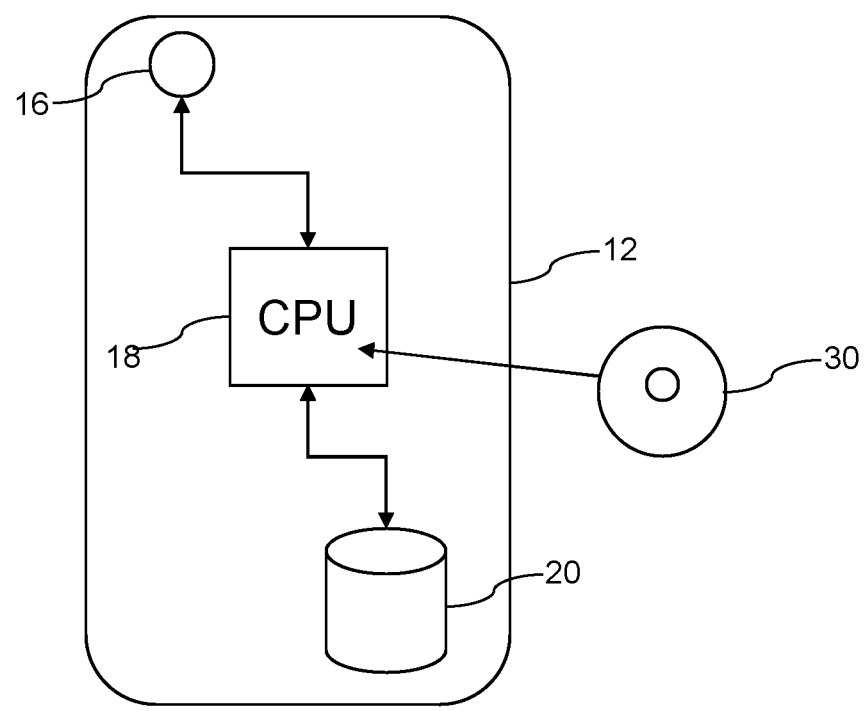
FIG. 6 is a further schematic diagram of the mobile phone that may be utilized to in accordance with certain aspects of an embodiment of the present.

FIG. 6 is a view similar to FIG. 2, which shows the internal components of the mobile phone 12, with the addition of a CD-ROM 30, which is a computer readable medium storing a computer program product for operating the mobile phone 12, in accordance with certain embodiments of the present invention. The computer program comprises instructions that are used to control the processor 18 of the mobile phone 12. The processor 18 is controlled to operate, for example, according to the method of FIG. 3, which describes aspects of certain embodiments of the present invention. As aforementioned, FIG. 3 defines, in certain embodiments, the operation of the mobile phone in relation to the switching to the do-not-disturb state or mode, where the handling of incoming calls is changed to reflect the fact that the user 10 does not wish to be disturbed at this point in time.

According to an aspect of an embodiment of the present invention, a method of operating a mobile telephone is provided. The method comprises detecting ambient noise in the vicinity of the mobile telephone, accessing one or more stored sounds, determining that the detected ambient noise matches one of the stored sounds, and switching the handling of incoming calls to a predetermined state in response to the determination of the match between the detected ambient noise and the one of the stored sounds.

According to another aspect of an embodiment of the present invention, a mobile telephone is provided. The mobile telephone comprises a microphone arranged to detect ambient noise in the vicinity of the mobile telephone, and a processor arranged to access one or more stored sounds, determine that the detected ambient noise matches one of the stored sounds, and switch the handling of incoming calls to a predetermined state in response to the determination of the match between the detected ambient noise and the one of the stored sounds.

According to a further aspect of the present invention, a computer program product is provided. The computer program product is on a computer readable medium for operating a mobile telephone and comprises instructions for detecting ambient noise in the vicinity of the mobile telephone, accessing one or more stored sounds, determining that the detected ambient noise matches one of the stored sounds, and switching the handling of incoming calls to a predetermined state in response to the determination of the match between the detected ambient noise and the one of the stored sounds.

One advantage of some embodiments of the present invention is that it they provide a method by which a mobile telephone can automatically detect that the user does not wish to be disturbed, by recognizing backgrounds sounds (such as the user's voice) and handling any incoming calls in a manner which will not disturb the phone's user (by diverting any incoming call to voicemail, for example).

In an embodiment of the present invention, the system uses the microphone on the user's mobile phone to passively detect the current conversational state. Based on this information, for example, any incoming call can be rejected and the sender informed that the user is currently occupied. The phone's microphone will passively listen and analyze the audio data to determine whether the phone user is speaking. When speech is detected it is then analyzed to determine if it is the mobile phone's user that is talking. This state, whether the user is speaking or not speaking, is then reported to the phone. The system may also analyze speaking frequencies of the user during a period of time and determine if the user is engaged in the conversation, but not currently talking. The period of time and frequency rates may be configurable by the user. The user may also have the option to turn the system off and alter the voice sample rate.

In an embodiment of the present invention, aspects of the embodiment can be configured from a simple binary, in conversation, not in conversation state, to a weighted system, using additional inputs. The voice monitoring can be integrated with sentiment analysis of the current conversation to determine if it is positive or negative, this can influence whether the user wishes to be disturbed. The system can also be configured to weight different conversations based on to whom the user is talking. The system can profile new voices and store those patterns. The system can then add more weight to frequently heard voices, people the user talks to more often, over those that are not recognized, people that the user does not know. For example, in this configuration the mobile phone may reject a call if the user is talking to a colleague, but may accept a call if the user is ordering a coffee from a shop.

In an embodiment of the present invention, using the newly reported state, the user may tell the system to react based on the changed state. Based on obtaining the user's instructions, an embodiment of the present invention may automatically ignoring the call by setting the phone to silent, vibrating once and then putting the phone on silent (the user can choose to continue talking or interrupt their conversation and still take the call), automatically rejecting the incoming call, and/or automatically rejecting the call and/or texting the caller informing the caller that the user is busy. With a weighted system, the user may adjust the response based on certain thresholds. For example, for a higher weight, reject all calls and for lower weight, vibrate and then put the phone on silent.

In an embodiment of the present invention, determining that the detected ambient noise matches one of the stored sounds comprises determining that the detected ambient noise matches one of the stored sounds for a predetermined minimum period of time. While the phone is monitoring the ambient noise and deciding whether to switch the phone to the "do-not-disturb" state for incoming calls, a matched sound may be occurring for a predetermined length of time, for example, for five seconds. An advantage of this aspect of certain embodiments of the present invention is that it ensures that the mobile phone does not flip into the do-not-disturb state unnecessarily and that short potential busy periods are not treated as the user being busy for a prolonged period of time.

In an embodiment of the present invention, the method further comprises switching the handling of incoming calls back to the previous state after a predetermined period of time. The switch of the mobile phone into the do-not-disturb state can be for a predefined length of time, such as thirty seconds or two minutes. After this period has expired, the mobile phone can then be switched back automatically to the previous state (whatever that was) so that incoming calls will now be handled as they were previously (mobile phone ringing as normal or whatever). An advantage of this aspect of certain embodiments of the present invention is that it removes the need of the mobile phone to continually monitor the ambient sounds to determine whether to switch state or not. Should the mobile phone further detect that user is still busy, then the phone can switch automatically to the do-not-disturb state.

In an embodiment of the present invention, the method further comprises receiving an audio input and storing the received audio input as a stored sound. The mobile phone can be configured so that the user can record the sounds that the user wishes the mobile phone to use as the trigger for the do-not-disturb mode. In one example, the sound may be the user's voice and this can be recorded by the mobile phone so that this can be primary sound that the mobile phone uses to switch to the do-not-disturb mode. Other sounds could also be used, including but not limited to, the user's vacuum cleaner.

Embodiments of the present invention may include a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, the method comprising:
   detecting, by a processor, ambient noise in a vicinity of the mobile telephone;
   accessing, by the processor, one or more stored sounds;
   determining, by the processor, that the ambient noise matches a stored sound of the one or more stored sounds and further determining that the ambient noise corresponds to a specific type of conversation;
   switching, by the processor, based on the specific type of conversation, handling of incoming calls to the mobile phone from a previous state to a predetermined state; and
   switching, by the processor, the handling of the incoming calls back to the previous state, after a predetermined period of time, based on an expiration of the predetermined period of time.

2. The computer-implemented method of claim 1, wherein the determining comprises:
   determining, by the processor, for a predetermined period of time, that the ambient noise matches the stored sound.

3. The computer-implemented method of claim 1, wherein the predetermined state comprises at least one of: passing the incoming calls to voicemail, switching the mobile phone to silent, or rejecting the incoming calls.

4. The computer-implemented method of claim 1, further comprising:
   receiving, by the processor, an audio input and storing the audio input as the stored sound.

5. A computer program product comprising:
   a computer readable storage medium readable by a processor and storing instructions for execution by the one or more processor for performing a method comprising:
   detecting, by the processor, ambient noise in a vicinity of the mobile telephone;
   accessing, by the processor, one or more stored sounds;
   determining, by the processor, that the ambient noise matches a stored sound of the one or more stored sounds and further determining that the ambient noise corresponds to a specific type of conversation;
   switching, by the processor, based on the specific type of conversation, handling of incoming calls to the mobile phone from a previous state to a predetermined state; and
   switching, by the processor, the handling of the incoming calls back to the previous state, after a predetermined period of time, based on an expiration of the predetermined period of time.

6. The computer program product of claim 5, wherein the determining comprises:
   determining, by the processor, for a predetermined period of time, that the ambient noise matches the stored sound.

7. The computer program product of claim 5, wherein the predetermined state comprises at least one of: passing the incoming calls to voicemail, switching the mobile phone to silent, or rejecting the incoming calls.

8. The computer program product of claim 5, the method further comprising:
   receiving, by the processor, an audio input and storing the audio input as the stored sound.

9. A system comprising:
   a memory;
   a processor in communication with the memory; and
   program instructions executable by the processor via the memory to perform a method, the method comprising:
   detecting, by the processor, ambient noise in a vicinity of the mobile telephone;
   accessing, by the processor, one or more stored sounds;
   determining, by the processor, that the ambient noise matches a stored sound of the one or more stored sounds and further determining that the ambient noise corresponds to a specific type of conversation;

switching, by the processor, based on the specific type of conversation, handling of incoming calls to the mobile phone from a previous state to a predetermined state; and switching, by the processor, the handling of the incoming calls back to the previous state, after a predetermined period of time, based on an expiration of the predetermined period of time.

10. The system of claim 9, wherein the determining comprises:

determining, by the processor, for a predetermined period of time, that the ambient noise matches the stored sound.

11. The system of claim 9, wherein the predetermined state comprises at least one of: passing the incoming calls to voicemail, switching the mobile phone to silent, or rejecting the incoming calls.

12. The system of claim 9, the method further comprising:

receiving, by the processor, an audio input and storing the audio input as the stored sound.

13. The system of claim 9, further comprising:

a microphone in communication with the processor, the microphone to detect ambient noise in the vicinity of the system and to provide the ambient noise to the processor.

* * * * *